US010539132B2

(12) United States Patent
Foster (10) Patent No.: US 10,539,132 B2
(45) Date of Patent: Jan. 21, 2020

(54) MODULAR GLAND ARRANGEMENTS FOR A PLUG VALVE (71) Applicant: Kerr Machine Co., Sulphur, OK (US)

(72) Inventor: Kelcy Jake Foster, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 15/685,178

(22) Filed: Aug. 24, 2017

(65) Prior Publication Data
US 2018/0058592 A1 Mar. 1, 2018

Related U.S. Application Data (60) Provisional application No. 62/379,462, filed on Aug. 25, 2016.

(51) Int. Cl.
F16K 5/04 (2006.01)
F16K 5/02 (2006.01)
F04B 53/16 (2006.01)
F04B 53/22 (2006.01)
F16K 3/24 (2006.01)
E21B 43/26 (2006.01)
F04B 53/10 (2006.01)

(52) U.S. Cl.
CPC ............... *F04B 53/16* (2013.01); *F04B 53/22* (2013.01); *F16K 5/0471* (2013.01); *F16K 5/0492* (2013.01); *E21B 43/26* (2013.01); *F04B 53/10* (2013.01); *F16K 3/243* (2013.01); *F16K 5/0271* (2013.01); *Y10T 137/0519* (2015.04); *Y10T 137/6058* (2015.04)

(58) Field of Classification Search
CPC . F16K 3/243; F16K 3/262; F16K 3/26; F16K 5/0271; F16K 5/0471; F16K 5/0673; F16K 5/0678; F16K 5/0689; F16K 5/04; F16K 5/0421; F16K 5/0457; F16K 5/0478
See application file for complete search history.

(56) References Cited

U.S. PATENT DOCUMENTS

| 2,741,138 A | 4/1956 | Russell |
| 2,813,695 A | 11/1957 | Stogner |
| 2,911,187 A | 11/1959 | Owsley |
| 3,061,267 A | 10/1962 | Hamer |
| 3,108,779 A | 10/1963 | Anderson |
| 3,133,722 A | 5/1964 | McGuire et al. |
| 3,146,988 A | 9/1964 | Riopelle et al. |
| 3,179,121 A | 4/1965 | Bredtschneider et al. |
| 3,346,002 A | 10/1967 | Thompson, Jr. et al. |
| 3,423,067 A | 1/1969 | Foster |
| 3,567,178 A | 3/1971 | Nelson |
| 3,795,385 A | 3/1974 | Westenrieder et al. |

(Continued)

*Primary Examiner* — Reinaldo Sanchez-Medina
*Assistant Examiner* — Hailey K. Do
(74) *Attorney, Agent, or Firm* — Tomlinson McKinstry, P.C.

(57) ABSTRACT

Insert elements that may be positioned within a high pressure plug valve. The elements have two or more recessed grooves formed around the fluid opening of the elements. The grooves are spaced from one another. A seal is placed in one and only one of the grooves. As wear occurs, the seal is relocated to one of the other grooves. Instead of a series of spaced grooves in a single insert element, a kit may be formed from two or more otherwise identical insert elements, each with a single recessed groove at a different position around the fluid opening.

20 Claims, 11 Drawing Sheets (56) References Cited

U.S. PATENT DOCUMENTS

| | | | |
|---|---|---|---|
| 4,113,228 A | 9/1978 | Frye | |
| 4,229,655 A * | 10/1980 | Ryding | H01J 37/18 |
| | | | 250/400 |
| 4,269,391 A | 5/1981 | Saito et al. | |
| 4,606,368 A * | 8/1986 | McCafferty | F16K 27/062 |
| | | | 137/15.22 |
| 4,702,457 A | 10/1987 | Lew et al. | |
| 4,795,133 A | 1/1989 | Berchem et al. | |
| 5,076,541 A | 12/1991 | Daghe et al. | |
| 5,234,194 A | 8/1993 | Smith | |
| 5,462,086 A | 10/1995 | Taylor et al. | |
| 6,029,948 A | 2/2000 | Shafer | |
| 6,554,249 B2 * | 4/2003 | Pang | F16K 5/188 |
| | | | 251/174 |
| 7,451,959 B2 | 11/2008 | Matzner | |
| 9,103,448 B2 * | 8/2015 | Witkowski | F16K 5/0457 |
| 9,638,337 B2 * | 5/2017 | Witkowski | F16K 5/0457 |
| 2002/0036279 A1 * | 3/2002 | Chatufale | F16K 5/0471 |
| | | | 251/172 |
| 2003/0010953 A1 * | 1/2003 | Coppock | F16K 3/22 |
| | | | 251/326 |
| 2014/0048734 A1 * | 2/2014 | Witkowski | F16K 5/0457 |
| | | | 251/309 |
| 2016/0201811 A1 * | 7/2016 | Hunter | E21B 1/00 |
| | | | 166/373 |

* cited by examiner

MODULAR GLAND ARRANGEMENTS FOR A PLUG VALVE

CROSS REFERENCE TO RELATED APPLICATION

This application claims the benefit of U.S. Provisional Application Ser. No. 62/379,462, filed Aug. 25, 2016, the entire contents of which are incorporated herein by reference.

SUMMARY

The present invention is directed to a valve comprising a body, a rotatable plug element, and plurality of insert elements. The body comprises a flow passage including an inlet passage and an outlet passage, and an enlarged internal chamber intersecting the flow passage. The rotatable plug element is positioned within the chamber and has a fluid passage extending therethrough. The plurality of insert elements are positioned within the chamber and cooperate to at least partially surround the plug element. Each insert element has a fluid opening extending therethrough and each has a first endless groove surrounding the fluid opening and a second endless groove surrounding the first groove. One and only one seal is positioned in a selected one of the first and second grooves of each insert.

The present invention is also directed to a kit comprising a valve body, a flow passage, a rotatable plug element, a plurality of first insert elements, and a plurality of second insert elements. The valve body comprises a flow passage that includes an inlet passage and an outlet passage, and an enlarged internal chamber that intersects the flow passage. The rotatable plug element is positioned within the chamber and has a fluid passage extending therethrough. The plurality of first insert elements are sized to surround the plug element within the chamber. Each of the first insert elements has a fluid opening extending therethrough and an endless groove surrounding that fluid opening. The plurality of second insert elements are sized to surround the plug element within the chamber. Each second insert element has a fluid opening extending therethrough, an endless groove surrounding that fluid opening, and a size and shape that matches that of the corresponding first insert element. The endless groove of each first insert element would fully surround or be fully surrounded by the endless groove of its corresponding second insert element if those insert elements were superimposed.

DETAILED DESCRIPTION

High pressure plug valves are typically used in oil and gas operations to control the flow of fluid throughout piping systems. The valve has a flow passage that may be selectively opened and closed in order to control the flow of fluid through the valve. Plug valves used in high pressure oil and gas operations must be able to withstand fluid pressures up to at least 22,500 pounds per square inch. However, the plug valves are typically used with fluid pressures around 15,000 pounds per square inch.

Figure 1:
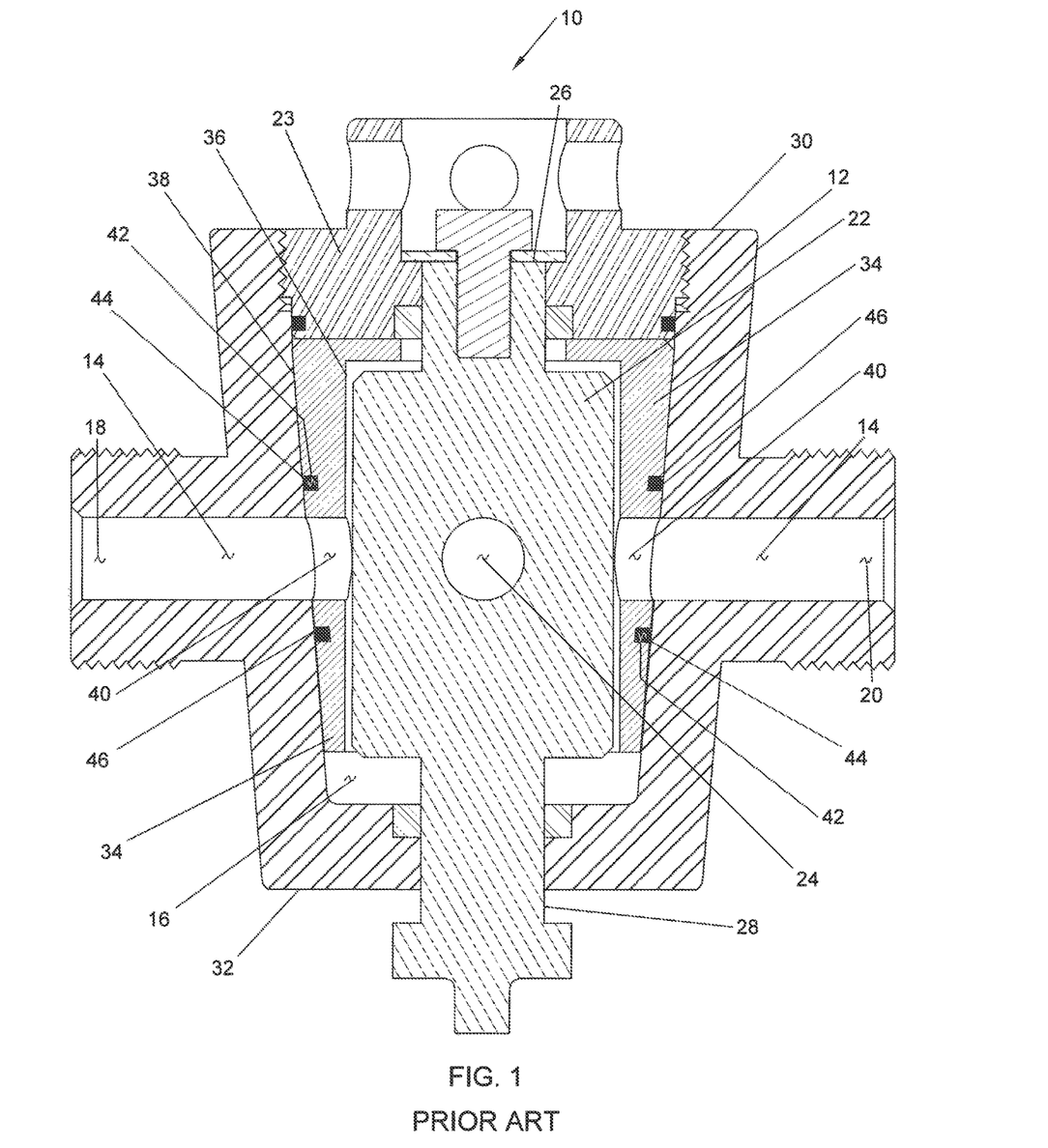
FIG. 1 is a side view of a plug valve known in the art. The valve body has been partially cut away to better display the internal components.

Turning now to FIG. 1, a plug valve 10 known in the art is shown. The plug valve 10 comprises a body 12 having a flow passage 14 and an enlarged internal chamber 16. The flow passage 14 intersects the internal chamber 16 and includes an inlet passage 18 and an outlet passage 20 formed on opposite sides of the chamber 16. The inlet and outlet passages 18 and 20 may be connected to a piping system (not shown).

The plug valve 10 further comprises a rotatable plug element 22 positioned within the internal chamber 16. The plug element 22 is secured within the chamber 16 by a retaining nut 23. A fluid passage 24 extends through the plug element 22. A pair of journals 26 and 28 are rigidly attached to opposite sides of the plug element 22 and extend out a top surface 30 and a bottom surface 32 of the body 12. The plug element 22 is rotated by rotating the journals 26 and 28.

To open the plug valve 10 such that fluid may flow through the flow-passage 14, the plug element 22 is rotated so that its fluid passage 24 is in-line with the flow passage 14, To close the plug valve 10 such that fluid may not flow through the flow passage 14, the plug element 22 is rotated so that its fluid passage 24 is not in-line with the flow passage 14.

The plug valve 10 further comprises a plurality of insert elements 34 positioned within the chamber 16 and cooperating to at least partially surround the plug element 22. Each plug valve 10 holds at least two insert elements 34. The insert elements 34 have an inner surface 36 and an outer surface 38. The inner surface 36 surrounds the plug element 22 and the outer surface 38 engages with the inner walls of the chamber 16. A fluid opening 40 interconnects the inner and outer surfaces 36 and 38 and has a fully closed cross-sectional profile. The fluid openings 40 are in-line with the flow passage 14 when the elements 34 are positioned within the chamber 16.

The insert elements 34 each comprise an endless groove 42 surrounding the fluid opening 40. An annular seal 44 may be positioned within the groove 42. The seal 44 blocks fluid from leaking into the internal chamber 16. The internal walls of the chamber 16 directly across from the position of the seals 44 act as sealing surfaces 46 for the seals 44 when the insert elements 34 are positioned within the chamber 16.

The plug valve 10 shown in FIG. 1 has a tapered internal chamber 16. Due to this, the outer surface 38 of the insert elements 34 are tapered so as to be closely received within the chamber 16. The elements 34 have a concave inner surface 36 and a spaced outer surface 38 that is congruent with the curved side of a cone.

Figure 2:
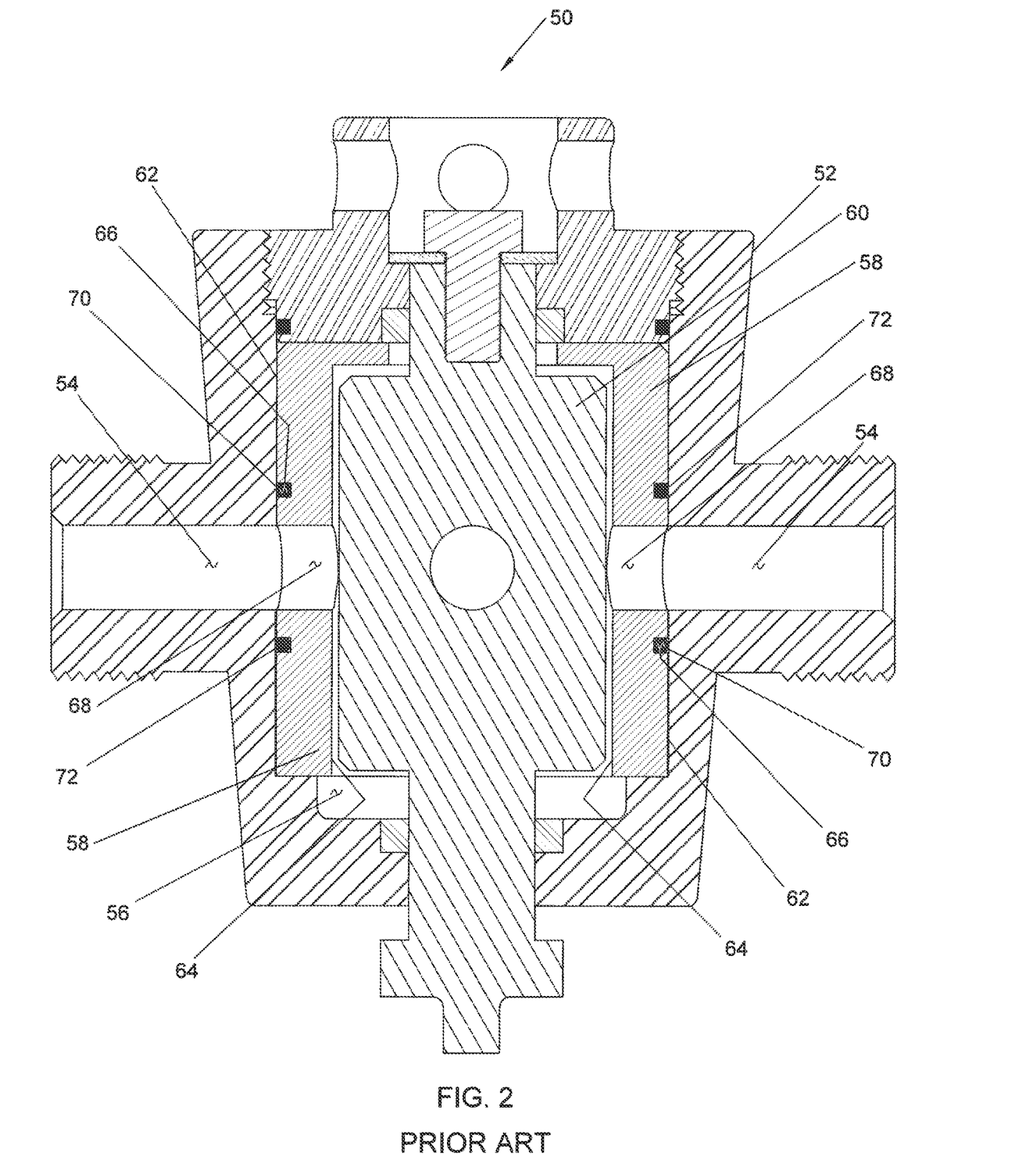
FIG. 2 is a side view of an alternative embodiment of a plug valve known in the art. The valve body has been partially cut away to better display the internal components.

With reference to FIG. 2, an alternative embodiment of a plug valve go known in the art is shown. The plug valve 50 comprises a body 52 having a flow passage 54 and an enlarged internal chamber 56. The plug valve 50 is identical to the plug valve 10, except that it has a cylindrical inner chamber 56, rather than a cone-shaped or tapered inner chamber 16 (FIG. 1).

A plurality of insert elements 58 are shown positioned around a rotatable plug element 60 within the internal chamber 56. The outer surfaces 62 of the insert elements 58 are not tapered so that they may be closely received within the non-tapered chamber 56. The insert elements 58 have a concave inner surface 64 and a spaced outer surface 62 that is congruent with the curved side of a cylinder.

The insert elements 58 each comprises an endless groove 66 surrounding a fluid opening 68. An annular seal 70 may be positioned within the groove 66 to prevent fluid from leaking into the internal chamber 56. The internal walls of the chamber 56 directly across from the position of the seals 70 act as sealing surfaces 72 for the seals 70 when the insert elements 58 are positioned within the chamber go.

With reference to FIGS. 1 and 2, plug valves 10 and 50 are susceptible to corrosive and/or abrasive fluid becoming trapped between the seals 44 or 70 and the sealing surfaces 46 or 72 of the chamber 16 or 56, This may cause the sealing surfaces 46 or 72 to erode over time and prevent the seals 44 or 70 from tightly engaging the sealing surfaces 46 or 72. Fluid may leak into the chamber 16 or 56 if the seals 44 or 70 cannot effectively seal against the sealing surfaces 46 or 72. If fluid leaks into the chamber 16 or 56, the plug valve 10 or 50 may not operate properly and may need to be replaced.

The present invention is directed to a system including a plurality of insert elements 34 or 58 that permit the seals 44 or 70 to be relocated within the chamber 16 or 56 over time. Relocating the seals 44 or 70 also relocates the sealing surfaces 46 or 72. Thus, if the original sealing surfaces 46 or 72 suffer erosion, the seals 44 or 70 can be moved to engage with different sealing surfaces 46 or 72 in the chamber 16 or 56. Such relocation will help extend the life of the plug valve 10 or 50.

Figure 3:
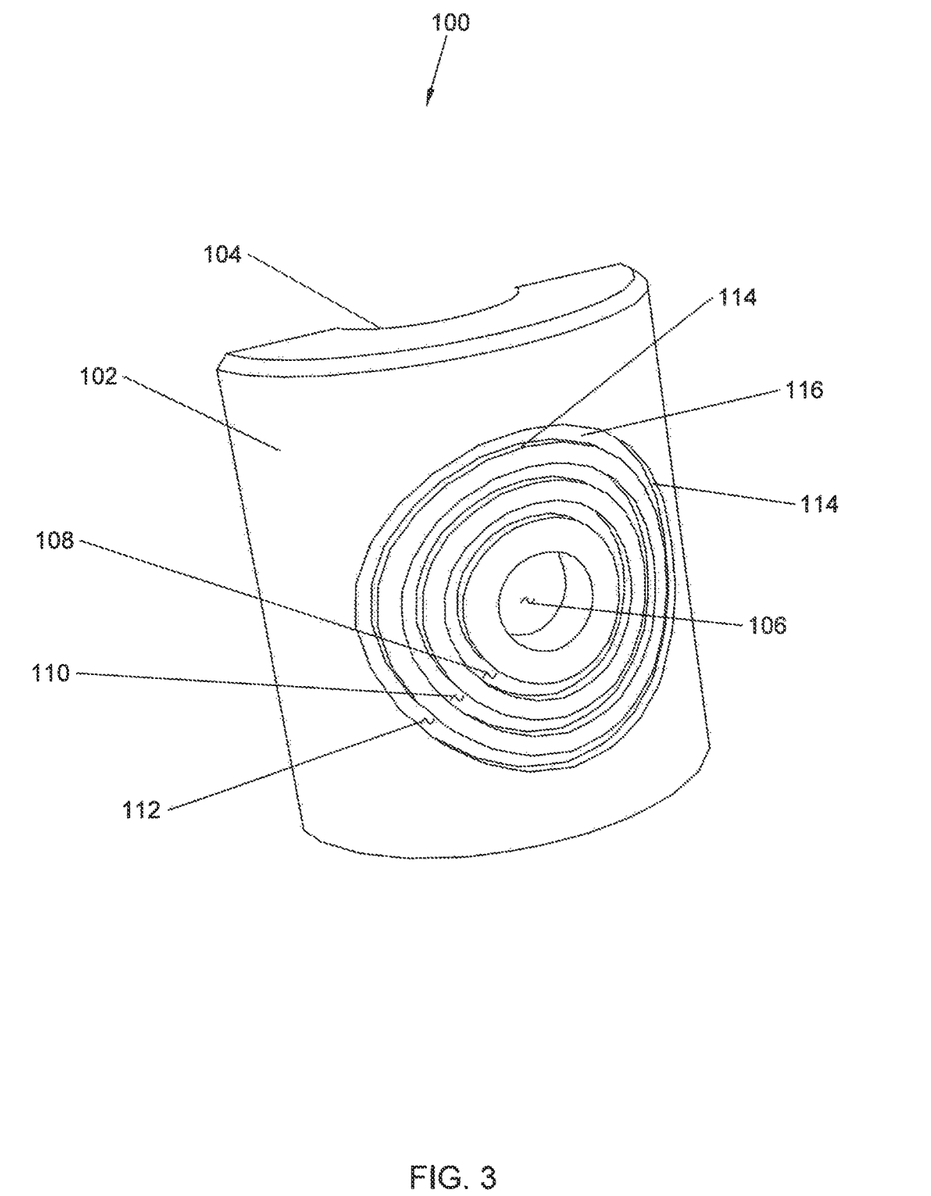
FIG. 3 is a perspective view of an insert element.

Turning now to FIG. 3, a first embodiment of the insert elements 100 is shown. The insert elements 100 have a spaced outer surface 102 and a concave inner surface 104. The insert elements 100 may be configured to fit within the tapered chamber 16 (FIG. 1) or the cylindrical chamber 56 (FIG. 2).

A fluid opening 106 is formed in the center of the elements 100. A first endless groove 108 is formed in the outer surface 102 surrounding the opening 106. A second endless groove 110 formed in the outer surface 102 surrounds the first groove 108, and a third endless groove 112 formed in the outer surface 102 surrounds the second groove 110. Each of the grooves 108, 110, and 112 is characterized by two side walls 114 joined by a base 116.

The grooves 108, 110, and 112 follow a circular path around the fluid opening 106. However, each of the grooves 108, 110, and 112 may vary in size and shape and follow a path of any shape or size desired around the fluid opening 106. For example, one or all of the grooves 108, 110, or 112 may follow a rectangular path around the fluid opening 106.

Figure 4:
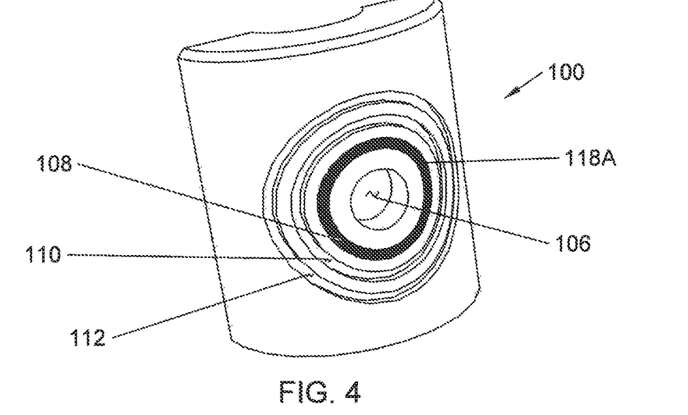
FIG. 4 is a perspective view of the insert element of FIG. 3 with a seal positioned in a first groove.
Figure 5:
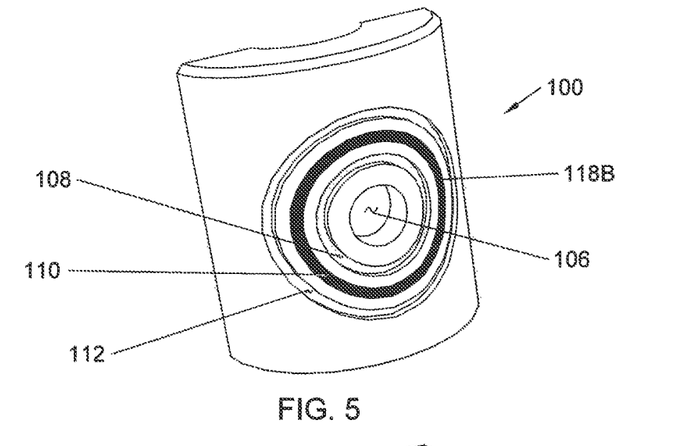
FIG. 5 is a perspective view of the insert element of FIG. 3 with a seal positioned in a second groove.
Figure 6:
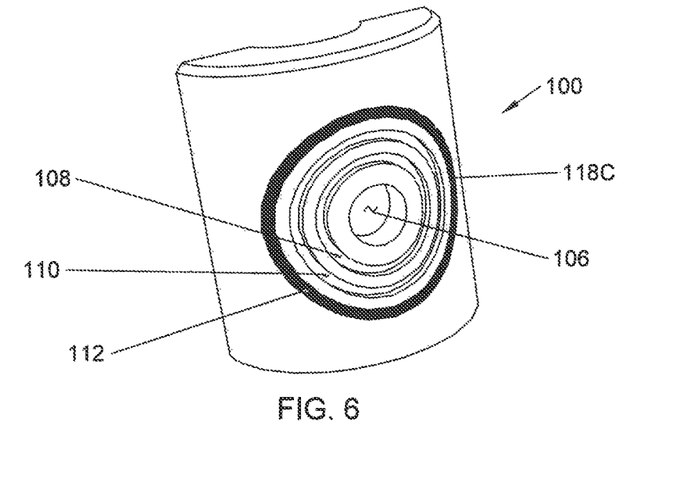
FIG. 6 is a perspective view of the insert element of FIG. 3 with a seal positioned in a third groove.

Turning now to FIGS. 4-6, a single seal may be positioned within each one of the grooves 108, 110, and 112 formed in the insert element 100. A first seal 118A is positioned within the first groove 108 in FIG. 4. A second seal 118B is positioned within the second groove 110 in FIG. 5, and a third seal 118C is positioned in the third groove 112 in FIG. 6. The seals 118A, 118B, or 118C surround the fluid opening 106 when positioned in the grooves 108, 110, and 112.

Figure 7:
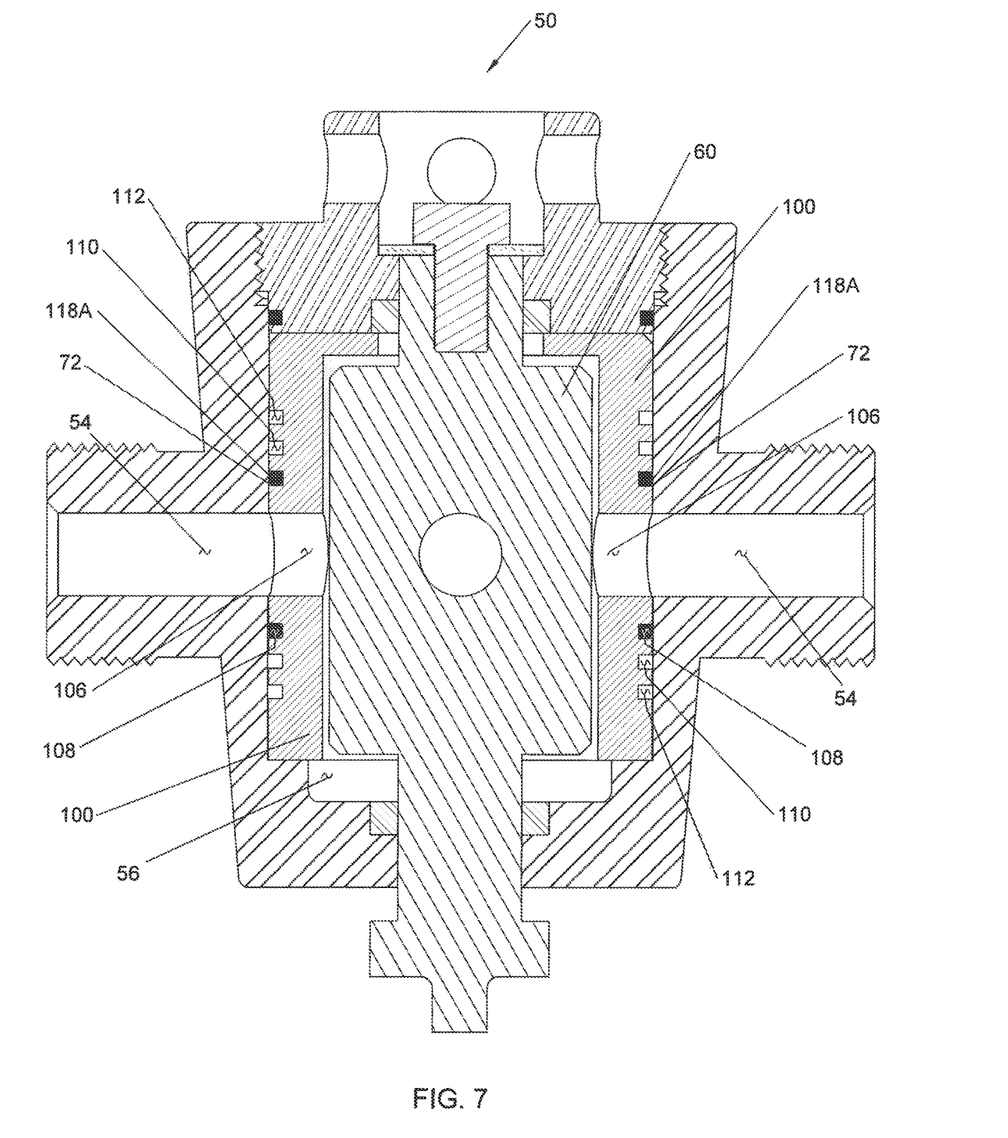
FIG. 7 is a side view of the plug valve of FIG. 2. The insert elements are those shown in FIG. 4.
Figure 8:
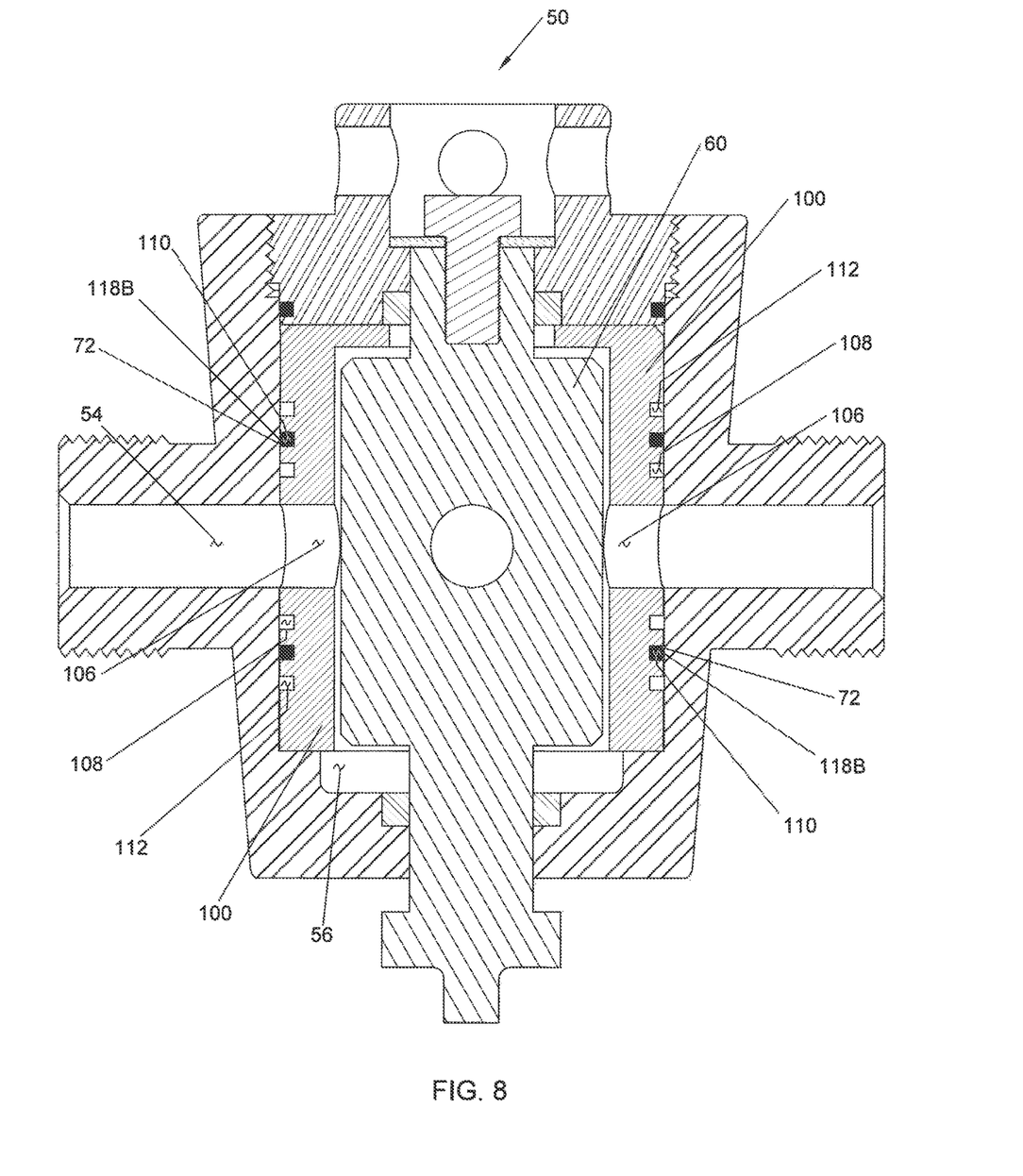
FIG. 8 is a side view of the plug valve of FIG. 2. The insert elements are those shown in FIG. 5.
Figure 9:
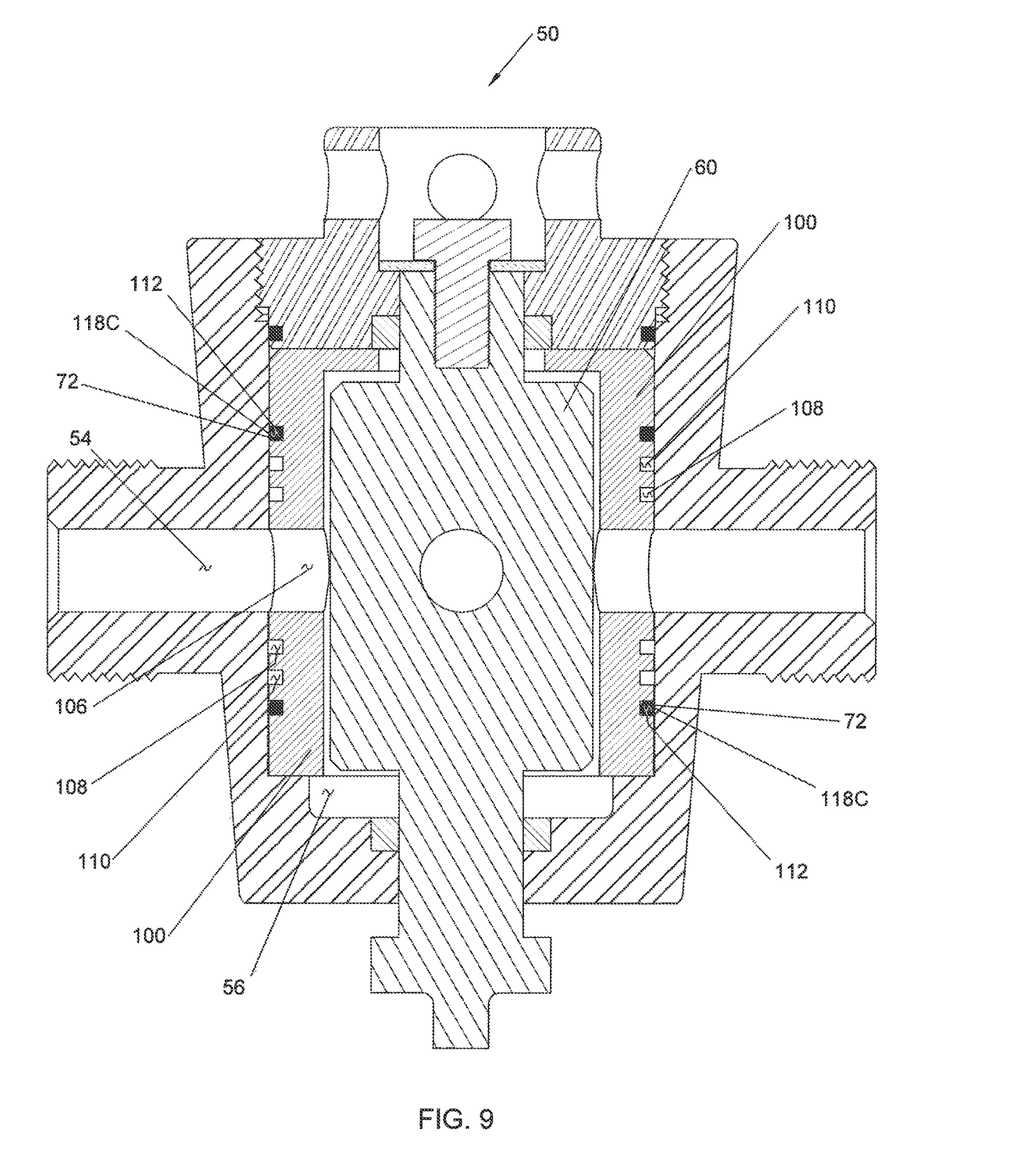
FIG. 9 is a side view of the plug valve of FIG. 2. The insert elements are those shown in FIG. 6.

With reference to FIGS. 7-9, the insert elements 100 are shown positioned within the chamber 56 of the plug valve 50. The operation described with reference to plug valve 50 is identical to the operation used with the plug valve 10 (FIG. 1).

In operation, the first seal 118A is positioned within the first groove 108 of the insert elements 100. The insert elements 100 are positioned within the chamber 56 so that they surround the plug element 60 and their fluid openings 106 are in-line with the flow passage 54 (FIG. 7). The seals 118A tightly engage the sealing surfaces 72 on the walls of the internal chamber 56.

High pressure fluid is passed through the plug valve 50. Over time, the sealing surfaces 72 for the first seals 118A will start to erode. If the first seals 118A start to leak, the flow of fluid into the plug valve 50 is stopped. The insert elements 100 are removed from the chamber 56 and the first seals 118A are removed from the first grooves 108. The second seals 118B are positioned in the second grooves 110 and the insert elements 100 are re-positioned within the chamber 56 (FIG. 8) and operations may resume. Because the position of the second seals 118B is spaced from the position of the first seals 118A, the second seals 118B will have new non-eroded sealing surfaces 72. Thus, the second seals 118B will offer enhanced resistance from leakage into the chamber 56.

As the sealing surfaces 72 experience erosion, the second seals 118B may begin to leak. The flow of fluid in the plug valve 50 is again stopped and the insert elements 100 are removed. The second seals 118B are removed from the insert elements 100 and the third seals 118C are positioned within the third grooves 112. The insert elements 100 are then re-positioned within the chamber 56 (FIG. 9) and operations may resume. Because the position of the third seals 118C is spaced from the position of the second seals 118B, the third seals 118C will have new non-eroded sealing surfaces 72. Thus, the third seals 118C will offer enhanced resistance from leakage into the chamber 56.

The operator may choose any order of positioning a single seal within any single one of the grooves desired. The order of operation described above is non-limiting and is just one method of using the inserts 100. For example, the operator may start the operation by positioning the third seal 118C in the third groove 112, rather than starting with the first seal 118A to the first groove 108.

The same methods described above may be employed using an insert element 100 having only two grooves or having more than three grooves. Once the final seal 118 no longer seals properly against its sealing surface 72, the plug valve 50 will likely need to be replaced. Because each plug valve 10 and go uses at least two different insert elements 100, the above method may be employed at different times for each element 100, depending on the wear incurred by the sealing surface 72 for the seal 118 within each element.

Figure 10:
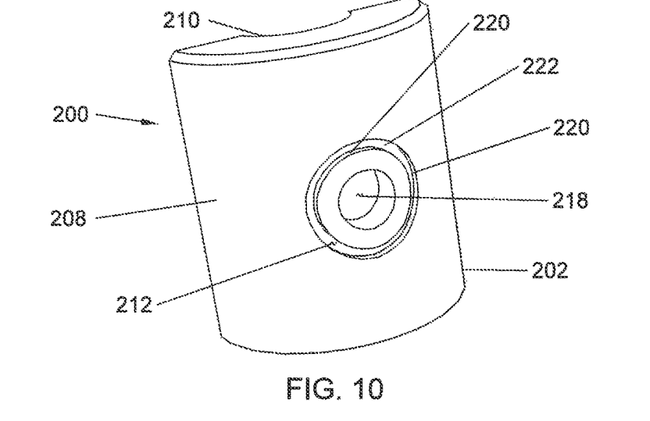
FIG. 10 is a perspective view of a first insert element. Together with the second and third insert elements shown in FIGS. 11 and 12, it forms a kit of a third embodiment of insert elements.
Figure 11:
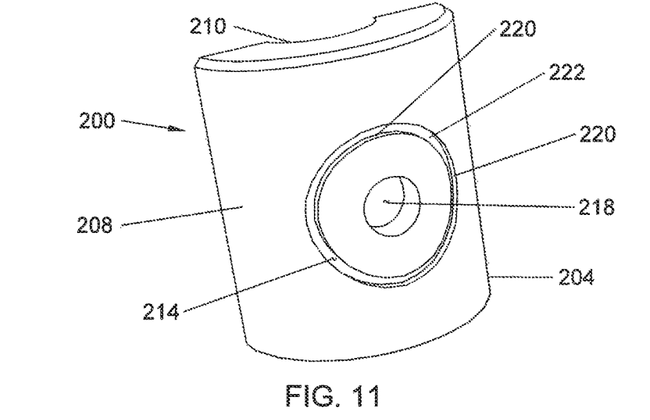
FIG. 11 is a perspective view of a second insert element.
Figure 12:
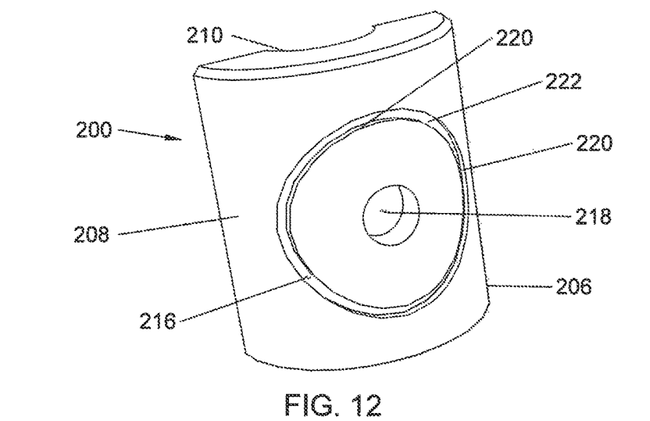
FIG. 12 is a perspective view of a third insert element.

Turning now to FIGS. 10-12, a second embodiment of the insert elements 200 is shown. The second embodiment 200 utilizes a kit comprising multiple insert elements 202, 204, and 206. The insert elements 200 have a spaced outer surface 208 and a concave inner surface 210. The insert elements 200 may be configured to fit within the tapered chamber 16 (FIG. 1) or the cylindrical chamber 56 (FIG. 2).

Except as described hereafter, the inserts 200 are identical in size and shape to the inserts 100. The inserts 200 include a first insert element 202, a second insert element 204, and a third insert element 206. Each of the insert elements 202, 204, and 206 has a single endless groove 212, 214, or 216 formed in its outer surface 208 and surrounding its fluid opening 218. Each of the grooves 212, 214, and 216 is characterized by two side walls 220 joined by a base 222.

The first insert element 202 has a first groove 212. The second insert element 204 has a second groove 214 that is outwardly spaced from the position of the first groove 212 in the first insert element 202. The third insert element 206 has a third groove 216 that is outwardly spaced from the position of the second groove 214. The first groove 212 is positioned nearest the fluid opening 218, and the third groove 216 is positioned nearest the edge of its respective insert element.

Each of the grooves 212, 214, and 216 is configured so that it would be fully surrounded or fully surround one another if the insert elements 202, 204, and 206 were superimposed. Like the grooves 108, 110, and 112 (FIG. 3), each of the grooves 212, 214, and 216 may vary in size, shape, and path as long as each of the grooves are spaced from one another and fully surround the fluid opening 218. A single seal may be positioned within each one of the grooves 212, 214, and 216.

Figure 13:
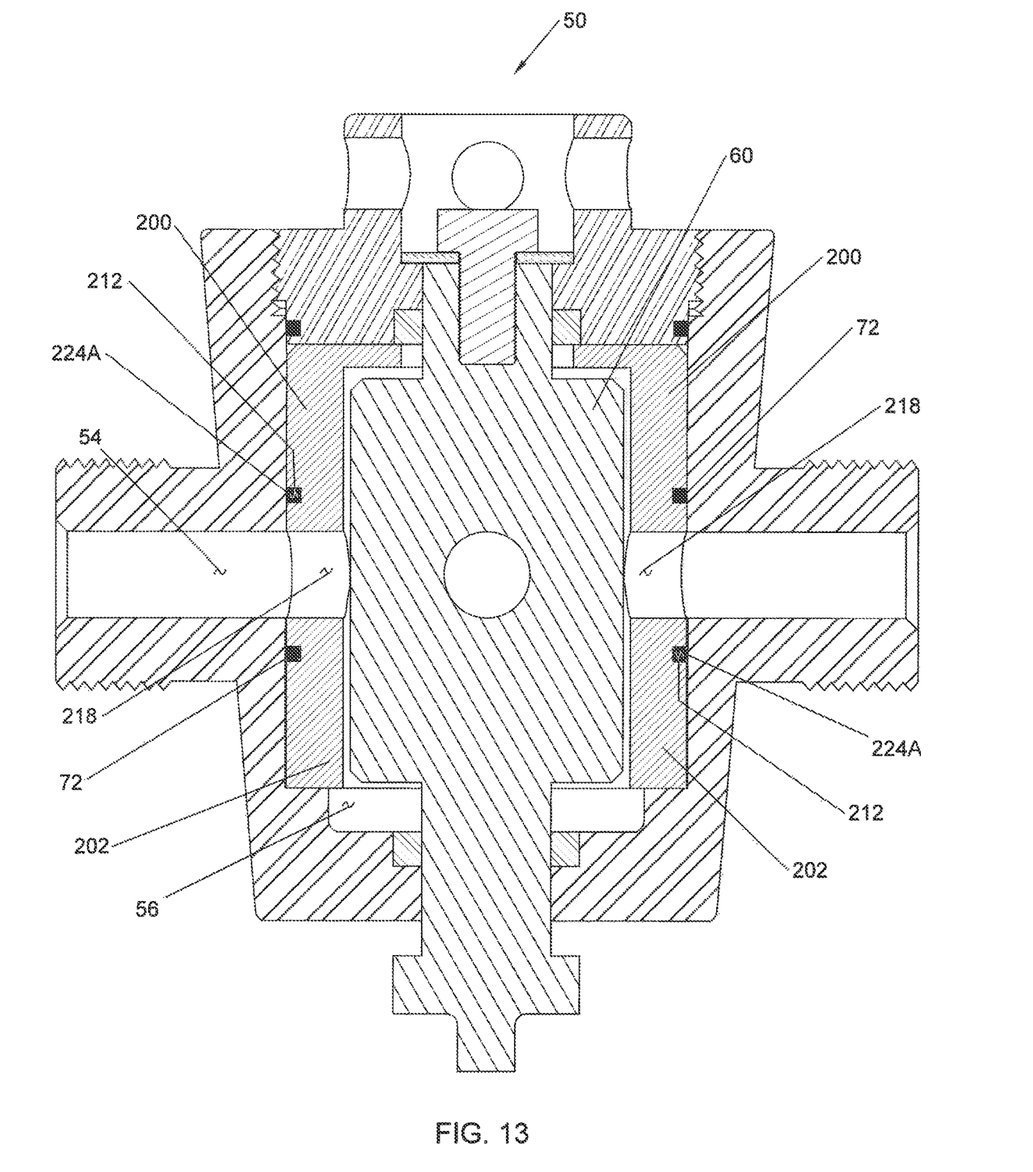
FIG. 13 is a side view of the plug valve of FIG. 2. The insert elements are those shown in FIG. 10.
Figure 14:
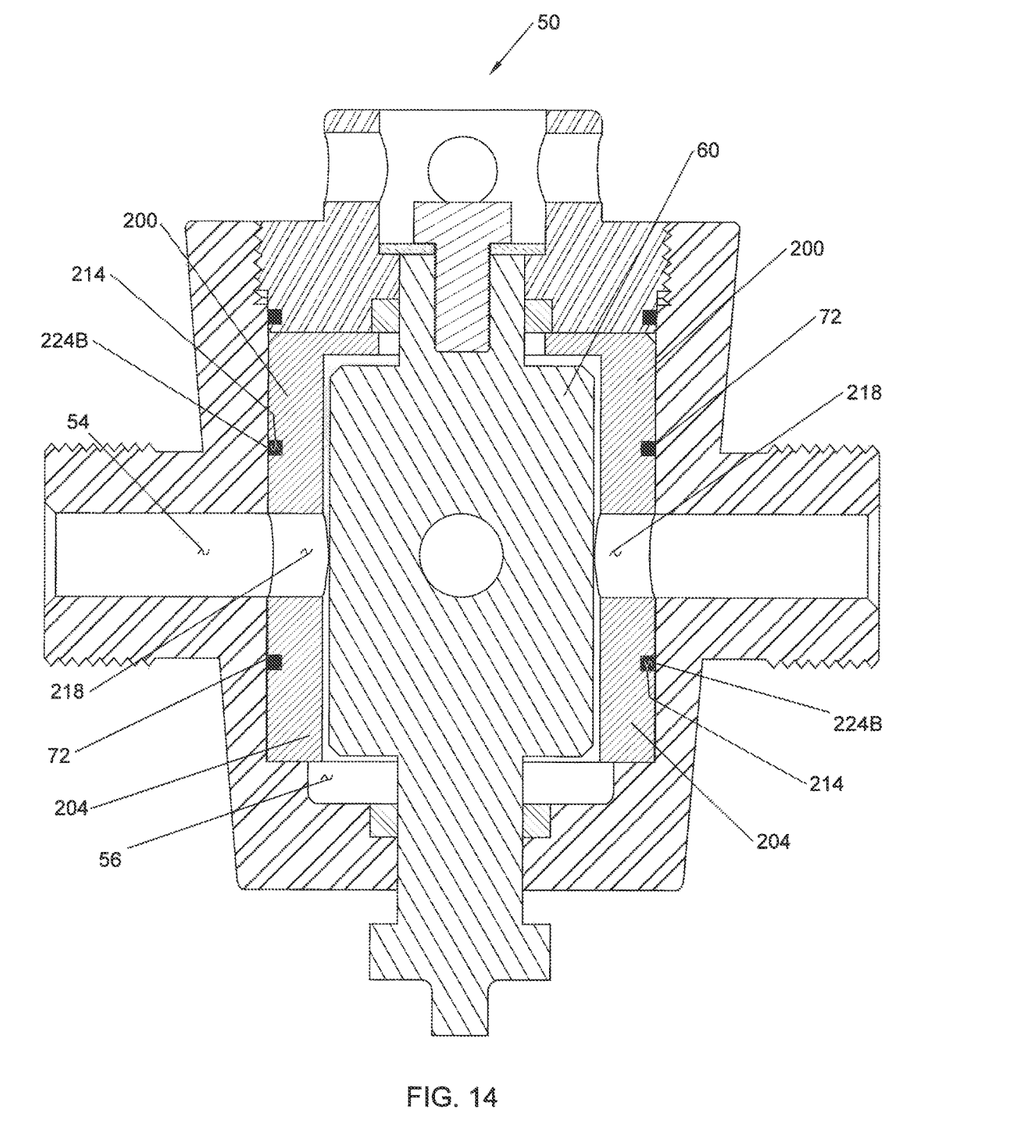
FIG. 14 is a side view of the plug valve of FIG. 2. The insert elements are those shown in FIG. 11.
Figure 15:
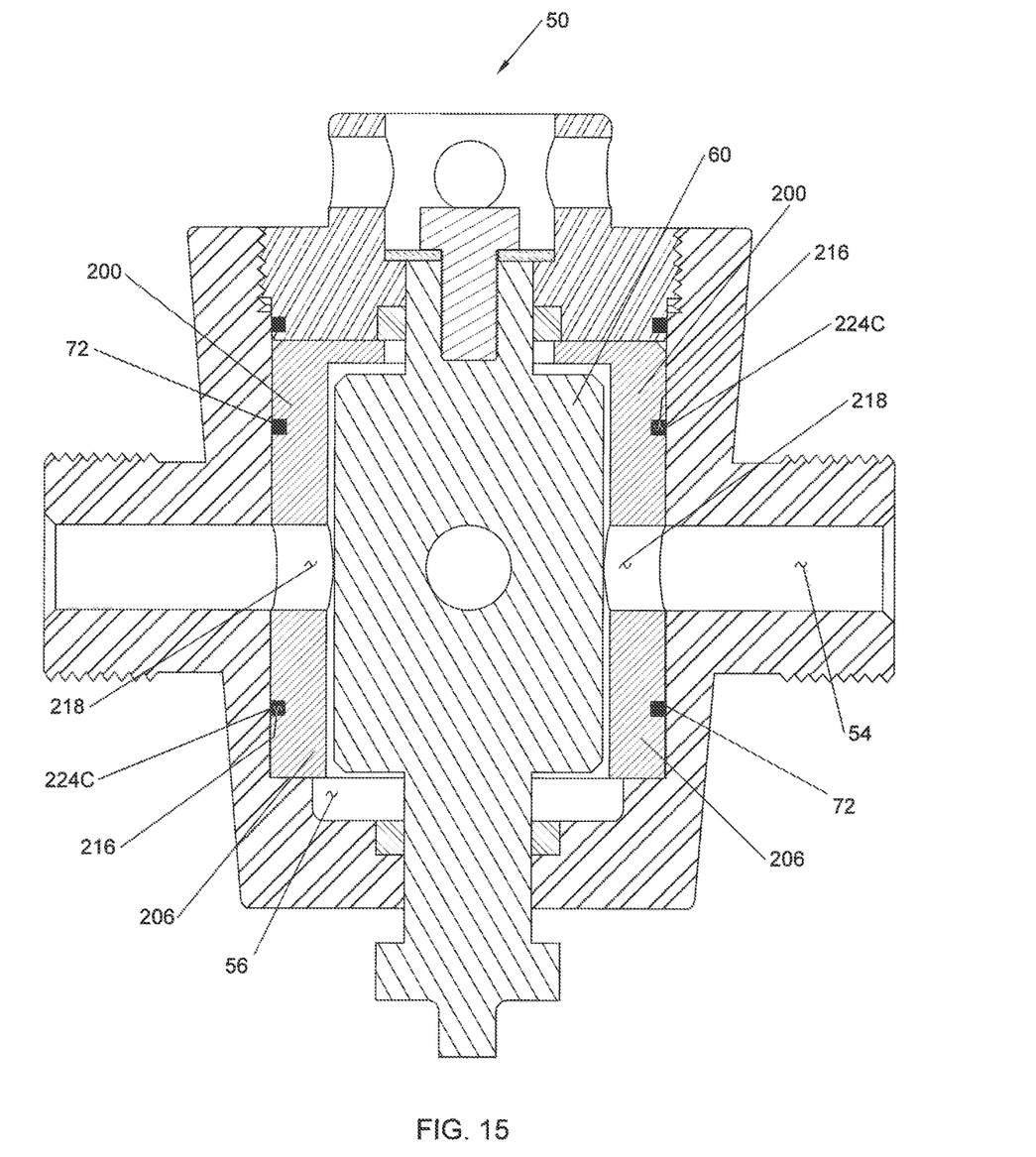
FIG. 15 is a side view of the plug valve of FIG. 2. The insert elements are those shown in FIG. 12.

Turning now to FIGS. 13-15, the insert elements 200 are shown positioned within the chamber 56 of the plug valve 50. The operation described with reference to plug valve 50 is identical to the operation used with the plug valve 10 (FIG. 1). FIGS. 13-15 show a first seal 224A positioned in the first groove 212, a second seal 224B positioned in the second groove 214, and a third seal 224C positioned in the third groove 216.

In operation, the operator will install the first insert elements 202 into the chamber 56 so that they surround the plug element 60 and their fluid openings 218 are in-line with the flow passage 54 (FIG. 13). The first seals 224A tightly engage the sealing surfaces 72 on the wall of the internal chamber 56.

High pressure fluid is passed through the plug valve 50. Over time, the sealing surfaces 72 for the first seals 224A will start to erode. If the first seals 224A start to leak, the flow of fluid into the plug valve 50 is stopped. The first insert elements 202 are removed from the chamber 56 and replaced with the second insert elements 204 (FIG. 14).

Because the position of the second seals 224B on the second insert elements 204 is spaced from that of the first seals 224A on the first insert elements 202, the second seals 224B will have new non-eroded sealing surfaces 72 in the chamber 56. Thus, the second seals 224B will offer enhanced resistance from leakage into the chamber 56.

As the sealing surfaces 72 experience erosion, the second seals 224B may begin to leak. The flow of fluid in the plug valve 50 is again stopped and the insert elements 204 are removed and replaced with the third insert elements 206 (FIG. 15). Because the position of the third seals 224C on the third insert elements 206 is spaced from the first and second seals 224A and 224B on the first and second insert elements 202 and 204, the third seals 224C will have new non-eroded sealing surfaces 72. Thus, the third seals 224C will offer enhanced resistance from leakage into the chamber 56.

The operator may choose any order of using the insert elements 200 desired. The order of operation described above is non-limiting and is just one method of using the insert elements 200. For example, the operator may start the operation by positioning the third insert element 206 into the chamber 56, rather than starting by positioning the first insert element 202 into the chamber 56.

The same methods described with reference to insert elements 200 may be employed using only two different insert elements 200 or more than three different insert elements 200. Once the seals 224 on the final insert elements no longer seal properly, the plug valve 50 will likely need to be replaced. Because each plug valve 10 or 50 uses at least two different insert elements 200, the above method may be employed at different times for each element 200, depending on the wear incurred by the sealing surfaces 46 or 72 for the seal 224 within each element.

Various modifications can be made in the design and operation of the present, invention without departing from the spirit thereof. Thus, while the principle preferred construction and modes of operation of the invention have been explained in what is now considered to represent its best embodiments, which have been illustrated and described, it should be understood that the invention may be practiced otherwise than as specifically illustrated and described.

The invention claimed is:

1. A valve, comprising:
   a body, comprising:
   a flow passage including an inlet passage and an outlet passage; and
   an enlarged internal chamber intersecting the flow passage;
   a rotatable plug element positioned within the enlarged internal chamber, the plug element having a fluid passage extending therethrough; and
   a plurality of insert elements positioned within the enlarged internal chamber and cooperating to at least partially surround the plug element, each insert element of the plurality of insert elements having a fluid opening extending therethrough and a groove system comprising:
   a first endless groove surrounding the fluid opening; and
   a second endless groove surrounding the first groove;
   a plurality of seals disposed in one-to-one relationship with the plurality of insert elements, such that the groove system of each of the plurality of insert elements receives one and only one seal.

2. The valve of claim 1 in which the groove system further comprises:
   a third endless groove surrounding the flow passage and spaced from the first and second endless grooves.

3. The valve of claim 1 in which each of the first and second endless grooves are characterized by two side walls joined by a base.

4. The valve of claim 1 in which each of the plurality of insert elements has a concave inner surface and a spaced outer surface, the fluid opening interconnecting the concave inner surface and the spaced outer surface having a fully closed cross-sectional profile.

5. The valve of claim 1 in which the first and second endless grooves are shaped differently.

6. The valve of claim 1 in which the first and second endless grooves each follow a circular path around the fluid opening.

7. The valve of claim 1 in which each insert element of the plurality of insert elements has an outer surface, in which a portion of the outer surface is congruent with a portion of a curved surface of a cone.

8. The valve of claim 1 in which each insert element of the plurality of insert elements has an outer surface, in which a portion of the outer surface is congruent with a portion of a curved side surface of a cylinder.

9. A system comprising:
the valve of claim 1; and
a fluid having a pressure of at least 15,000 pounds per square inch within at least a portion of the flow passage.

10. A method of using the valve of claim 1, in which each of the plurality of seals is designated as a first seal and comprising:
removing at least one of the plurality of insert elements from the valve;
removing the first seal from each of the at least one of the plurality of insert elements;
positioning a second seal within the groove system of each of the at least one of the plurality of insert elements, in a groove from which no first seal was removed; and
positioning the at least one of the plurality of insert elements into the enlarged internal chamber of the valve.

11. A kit, comprising:
a valve body, comprising:
a flow passage including an inlet passage and an outlet passage; and
an enlarged internal chamber intersecting the flow passage;
a rotatable plug element positioned within the enlarged internal chamber, having a fluid passage extending therethrough;
a plurality of first insert elements sized to surround the plug element within the enlarged internal chamber, each first insert element having a fluid opening extending therethrough and one and only one endless groove surrounding that fluid opening; and
a plurality of second insert elements sized to surround the plug element within the enlarged internal chamber, each second insert element having a fluid opening extending therethrough and one and only one endless groove surrounding that fluid opening;
in which the one and only one endless groove of each first insert element would fully surround or be fully surrounded by the one and only one endless groove of its corresponding second insert element if the said first and second insert elements were superimposed.

12. The kit of claim 11 further comprising a plurality of third insert elements sized to surround the plug element within the enlarged internal chamber, each third insert element having a fluid opening extending therethrough, and one and only one endless groove surrounding that fluid opening, in which the one and only one endless groove of each third insert element would fully surround or be fully surrounded by the one and only one endless groove of any of its corresponding first and second insert elements if the said first, second, and third insert elements were superimposed.

13. The kit of claim 11 in which the said-endless grooves are characterized by two side walls joined by a base.

14. The kit of claim 11 in which each of the plurality of first insert elements and each of the plurality of second insert elements has a concave inner surface and a spaced outer surface, the fluid opening interconnecting the concave inner surface and the spaced outer surface having a fully closed cross-sectional profile.

15. The kit of claim 11 in which the said-endless grooves of each of the plurality of first insert elements are shaped differently than the said endless grooves of each of the plurality of second insert elements.

16. The kit of claim 11 in which each of the plurality of first insert elements has a size and shape matching the size and shape of each of the plurality of second insert elements.

17. The kit of claim 11 in which each of the plurality of first insert elements and each of the plurality of second insert elements has an outer surface, a portion of the outer surface being congruent with a portion of a curved surface of a cone.

18. The kit of claim 11 in which each of the plurality of first insert elements and each of the plurality of second insert elements has an outer surface, in which a portion of the outer surface is congruent with a portion of a curved side surface of a cylinder.

19. A system comprising:
the kit of claim 11; and
a fluid having a pressure of at least 15,000 pounds per square inch within at least a portion of the flow passage.

20. A method of using the kit of claim 11, comprising:
positioning a first seal within the said endless groove of at least one of the plurality of first insert elements;
placing the at least one of the plurality of first insert elements within the enlarged internal chamber;
removing the at least one of the plurality of first insert elements from the enlarged internal chamber;
positioning a second seal within the said endless groove of at least one of the plurality of second insert elements; and
placing the at least one of the plurality of second insert elements within the enlarged internal chamber.

* * * * *

UNITED STATES PATENT AND TRADEMARK OFFICE
CERTIFICATE OF CORRECTION

PATENT NO. : 10,539,132 B2  
APPLICATION NO. : 15/685178  
DATED : January 21, 2020  
INVENTOR(S) : Kelcy Jake Foster

Page 1 of 1

It is certified that error appears in the above-identified patent and that said Letters Patent is hereby corrected as shown below:

In the Specification

Column 3, Line 11, please delete "go" and substitute therefore "50".
Column 3, Line 30, please delete "go" and substitute therefore "56".
Column 3, Line 34, please delete "56," and substitute therefore "56.".
Column 4, Line 62, please delete "go" and substitute therefore "50".

Signed and Sealed this
Twenty-fifth Day of February, 2020

Andrei Iancu
*Director of the United States Patent and Trademark Office*